United States Patent
Zheng et al.

(10) Patent No.: US 8,130,781 B2
(45) Date of Patent: Mar. 6, 2012

(54) METHOD AND APPARATUS FOR PROVIDING DYNAMIC SELECTION OF CARRIERS

(75) Inventors: Haihong Zheng, Coppell, TX (US);
Rene Purnadi, Coppell, TX (US);
Naveen Kakani, Irving, TX (US);
Adrian Boariu, Irving, TX (US);
Prabodh Varshney, Coppell, TX (US)

(73) Assignee: Intellectual Ventures I LLC, Wilmington, DE (US)

( * ) Notice: Subject to any disclaimer, the term of this patent is extended or adjusted under 35 U.S.C. 154(b) by 961 days.

(21) Appl. No.: 11/068,064

(22) Filed: Feb. 28, 2005

(65) Prior Publication Data

US 2006/0193338 A1    Aug. 31, 2006

(51) Int. Cl.
*H04J 3/16* (2006.01)

(52) U.S. Cl. .................... 370/437; 370/310; 370/441

(58) Field of Classification Search .................. 370/437, 370/441, 335, 320, 310
See application file for complete search history.

(56) References Cited

U.S. PATENT DOCUMENTS

| | | | |
|---|---|---|---|
| 6,374,112 B1* | 4/2002 | Widegren et al. | 455/452.2 |
| 6,819,660 B2* | 11/2004 | Khare et al. | 370/342 |
| 7,327,775 B1* | 2/2008 | Gu | 375/130 |
| 7,450,064 B2* | 11/2008 | Rowitch et al. | 342/357.15 |
| 2003/0099219 A1* | 5/2003 | Abrol et al. | 370/338 |
| 2004/0252724 A1* | 12/2004 | Jou | 370/480 |
| 2005/0007977 A1* | 1/2005 | Jou | 370/328 |
| 2005/0201382 A1* | 9/2005 | Xue et al. | 370/395.21 |
| 2006/0013182 A1* | 1/2006 | Balasubramanian et al. | 370/343 |
| 2006/0142051 A1* | 6/2006 | Purnadi et al. | 455/552.1 |

FOREIGN PATENT DOCUMENTS

| | | |
|---|---|---|
| EP | 0 928 084 | 7/1999 |
| EP | 1503534 | 2/2005 |
| JP | 08-070330 | 3/1996 |
| JP | 11-284688 | 10/1999 |
| JP | 2003-348047 | 12/2003 |
| JP | 2004-080333 | 3/2004 |
| JP | 2005-020599 | 1/2005 |
| WO | WO-99/00915 | 1/1999 |
| WO | WO 0233925 | 4/2002 |

OTHER PUBLICATIONS

IEEE 100 The Authoritative Dictionary of IEEE Standards Terms, 2000, the Institute of Electrical and Electronics Engineers, Inc, Seventh Edition, p. 542.*
PCT/IB2006/000397, International Search Report, Jun. 22, 2006.
Cesana, et al., Impact of mixed voice and data traffic on the UMTS-FDD performance, IEEE, Nov. 2002, Section II A, pp. 758-762.
Office Action for Chinese Application 200680006161.5, dated Jan. 8, 2010.
Office Action for Japanese Application 2007-557610, mailed May 10, 2010 (with English translation).
Decision of Rejection issued Jun. 7, 2011 on Japanese Patent Application 2007-557610.

* cited by examiner

*Primary Examiner* — Kwang B Yao
*Assistant Examiner* — Nguyen Ngo

(57) ABSTRACT

An approach is provided for communicating in a multi-carrier system. A carrier selector selects one or more carriers among a plurality of carriers for transport of data over the multi-carrier system, wherein the data is transmitted using the selected carriers.

42 Claims, 10 Drawing Sheets

METHOD AND APPARATUS FOR PROVIDING DYNAMIC SELECTION OF CARRIERS

FIELD OF THE INVENTION

The present invention relates to communications, and more particularly, to providing selection of carriers in a multi-carrier system.

BACKGROUND OF THE INVENTION

Radio communication systems, such as cellular systems, provide users with the convenience of mobility along with a rich set of services and features. This convenience has spawned significant adoption by an ever growing number of consumers as an accepted mode of communication for business and personal uses. As a result, cellular service providers are continually challenged to enhance their networks and services as well as increase their customer base. New services require development of new standards. Such development, unfortunately, can pose compatibility issues with existing or legacy systems.

One area that has received significant attention concerns accommodating single carrier technology in a multi-carrier system. Traditionally, this has entailed introducing greater complexity in a mobile node to detect the multiple carriers. Beyond the increased complexity and associated cost, the detection process imposes a heavy demand on operating power, and thereby, reduces talk-time. Further, from the network side, it is recognized that all of the multiple carriers are utilized irrespective of the traffic load. The drawback with such an approach is that precious network capacity is wasted if the load does not fully utilize the full capacity of the carriers.

Therefore, there is a need for an approach to provide a multi-carrier system that can efficiently support backward compatibility with a single carrier system.

SUMMARY OF THE INVENTION

These and other needs are addressed by the present invention, in which an approach provides selection of carriers and/or channels over a radio communication network.

According to one aspect of an embodiment of the present invention, a method for communicating in a multi-carrier system is disclosed. The method includes selecting one or more carriers among a plurality of carriers for transport of data over the multi-carrier system. The method also includes initiating transmission of the data using the selected carriers.

According to one aspect of an embodiment of the present invention, an apparatus for communicating in a multi-carrier system is disclosed. The apparatus includes means for selecting one or more carriers among a plurality of carriers for transport of data over the multi-carrier system. The apparatus also includes means for initiating transmission of the data using the selected carriers.

According to one aspect of an embodiment of the present invention, an apparatus for communicating in a multi-carrier system is disclosed. The apparatus includes a carrier selector configured to select one or more carriers among a plurality of carriers for transport of data over the multi-carrier system, wherein the data is transmitted using the selected carriers.

According to another aspect of an embodiment of the present invention, a method for supporting communication in a multi-carrier spread spectrum system is disclosed. The method includes selecting one or more sub-carriers for use in the multi-carrier spread spectrum system according to a criterion including a Quality of Service (QoS) requirement, a channel quality, or load of the sub-carriers.

According to yet another aspect of an embodiment of the present invention, a method for supporting communication in a multi-carrier spread spectrum system is disclosed. The method includes determining a mode of operation of a mobile station (MS), wherein the mode includes a 1X mode corresponding to use of a single carrier and a nX mode corresponding to use of multiple carriers. The method also includes selecting one or more carriers among a plurality of carriers according to the mode of operation. The carriers include a dedicated carrier, a shared carrier, and a combined carrier. The combined carrier supports capacity that is partially shared and partially dedicated.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

An apparatus, method, and software for supporting selection of carriers and/or channels over a radio communication network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to a spread spectrum system, it is recognized by one of ordinary skill in the art that the present invention has applicability to any type of multi-carrier system.

Figure 1:
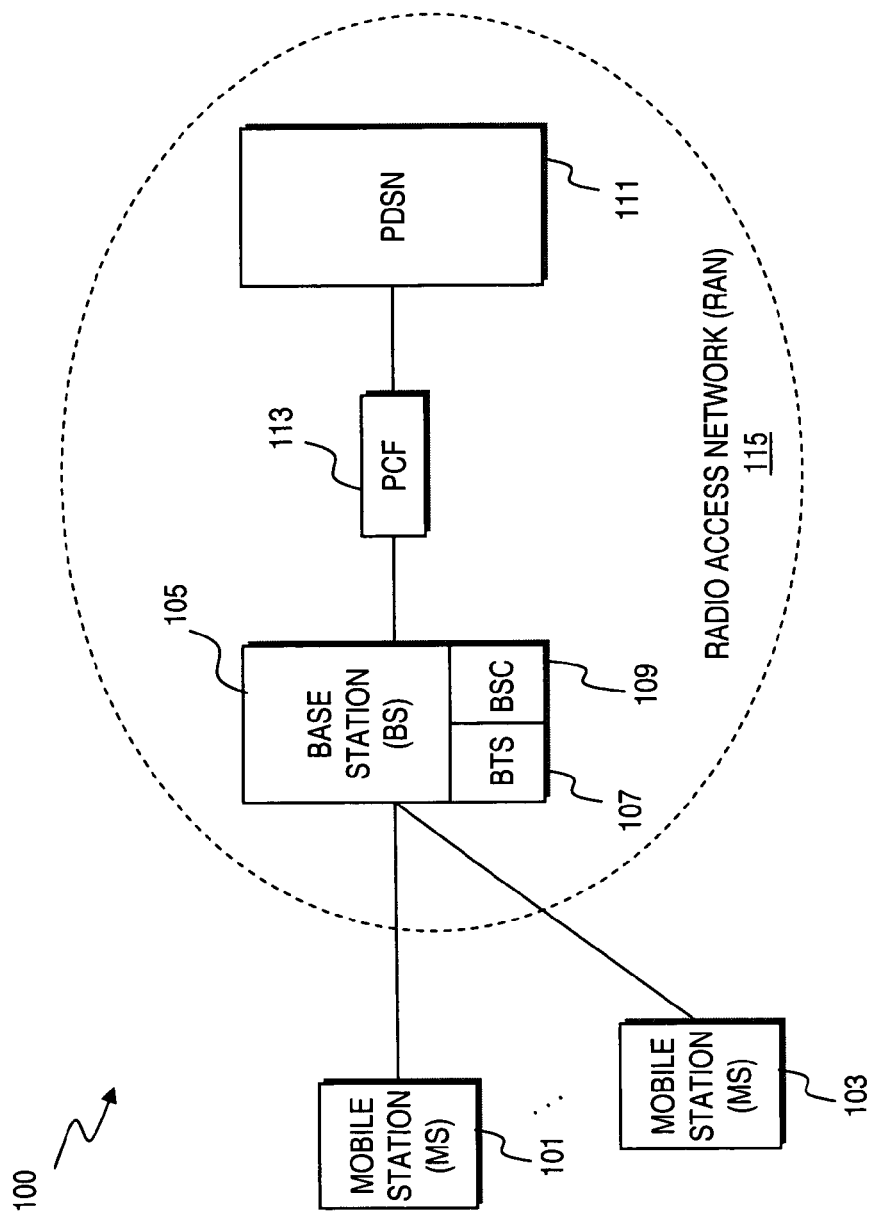
FIG. 1 is a diagram of a radio communication system capable of providing dynamic carrier and channel selection, in accordance with an embodiment of the present invention.

FIG. 1 is a diagram of a radio communication system capable of providing dynamic carrier and channel selection, in accordance with an embodiment of the present invention. A radio network 100 includes Mobile Stations (MS) 101, 103 in communication with a Base Station (BS) 105. According to one embodiment of the present invention, the radio network 100 supports Third Generation (3G) services as defined by the International Telecommunications Union (ITU) for International Mobile Telecommunications 2000 (IMT-2000). For the purposes of explanation, the carrier and channel selection capability of the radio network 100 is explained with respect to a cdma2000 architecture. As the third-generation version of IS-95, cdma2000 is being standardized in the Third Generation Partnership Project 2 (3GPP2).

In this example, the base station 105 includes a Base Transceiver Station (BTS) 107 and Base Station Controller (BSC) 109. Although a single BTS 107 is shown, it is recognized that multiple BTSs are typically are connected to the BSC 109 through, for example, point-to-point links. The BS 105 is linked to a Packet Data Serving Node (PDSN) 111 through a Packet Control Function (PCF) 113. The PCF 113 is largely responsible for directing Point-to-Point Protocol (PPP) connection requests from the MS 101 to the PDSN 111. The BS 105, PCF 113, and PSDN 111 constitute the Radio Access Network (RAN) 115.

The cdma2000 radio configuration encompasses two modes of operations: 1X and multi-carrier (i.e., nX). 1X refers to the mode that is bandwidth-compatible with IS-95, i.e., with bandwidth of 1.25 MHZ. Multi-carrier uses multiple 1X carriers to increase the data rate to the mobile terminal (e.g., MS 101, 103) over the forward link. Unlike 1X technology, the multi-carrier system operates over multiple carriers. In other words, the mobile station 101, 103 is able to access multiple carriers simultaneously. To address the capacity limitation problem due to multi-user interference in a CDMA system, Orthogonal-Frequency-Division-Multiplexing (OFDM) can be used to combat the frequency selectivity of the channel.

The standardization process has focused on 1X systems, including 1XEV-DV (Evolutionary/Data and Voice) and 1X EV-DO (Evolutionary/Data Only). It is recognized that such focus on developing 1XEV-DV and 1X EV-DO systems has detracted from any effort to update the multi-carrier system. Although the standard has some provisions to extend the operating bandwidth by N times (N=3, 5, 7, . . . ) to produce the multi-carrier system, the system described in the standard lacks backward compatibility with IS-95 and current 1X system.

In particular, the standard does not provide any references for the new channels defined for data transmission, such as the forward packet data channel (F-PDCH) and the corresponding signaling channels associated with it. The current standard for the multi-carrier system details only the forward fundamental channel (F-FCH), which is primarily used for voice traffic. For the F-FCH of a multi-carrier system, the standard specifies that the transmitted symbols of a user be multiplexed (alternately distributed) on the corresponding three sub-carriers. That is, in the cdma2000 multi-carrier mode, the user data is divided between the three parallel sub-carriers over the forward link.

Extending the approach for F-FCH to for the case of F-PDCH in a multi-carrier system has a number of problems. First, the approach does not provide backward compatibility with a mobile node operating in the IS-95, 1X and 1X EV-DV mode (e.g., Revision D). Second, the mobile node is forced to detect all the three sub-carriers, irrespective whether or not there is enough data to justify use of all sub-carriers, as previously mentioned. The operating power for the mobile node is very demanding, especially in the detection process. Third, the existing encoder packet sizes used by the physical layer in 1XEV-DV system would be inefficiently used if the system is extended to multi-carrier system, especially for the small size packets.

Essentially, if the concept of F-PDCH designed were employed for 1X EV-DV to the multi-carrier mode, then a forward packet data control channel (F-PDCCH) should be employed to provide control function for the three F-PDCCHs over the three sub-carriers. However, such design is highly complex, if even technically achievable, especially in the case that 1X and multi-carrier users are served simultaneously on the forward link.

Unlike conventional systems in which use of differing numbers of carriers are inflexible, the system 100 provides selection of carriers to improve spectrum efficiency.

Figure 2:
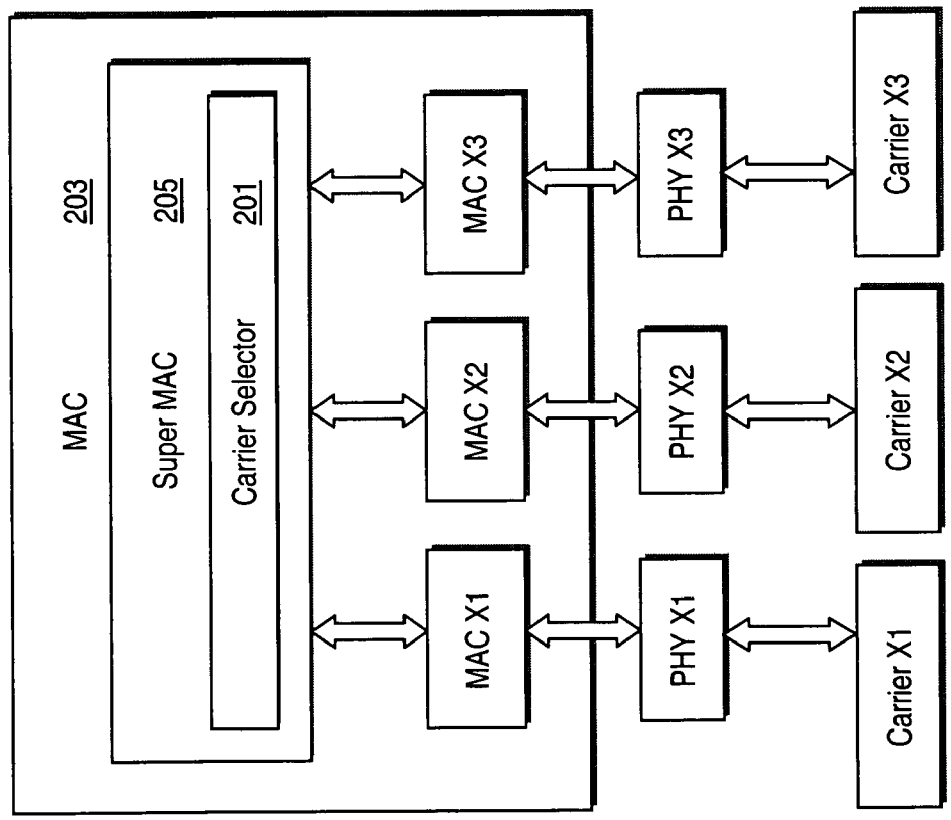
FIG. 2 is a diagram of a radio layer structure with a carrier selector implemented in a Medium Access Control (MAC) layer, in accordance with an embodiment of the present invention.

FIG. 2 is a diagram of a radio layer structure with a carrier selector implemented in a Medium Access Control (MAC) layer, in accordance with an embodiment of the present invention. As described, the system 100 enables, on the forward link, the transmission of user data over M sub-carriers in an N sub-carrier system, where the value of M is one or more and no larger than the value of N. Accordingly in a system in which N is 3 (i.e., 3X system), user data can be transmitted over 1 or 2 or 3 sub-carriers. In contrast, the traditional multi-carrier system would evenly spread the data over all 3 sub-carriers. The entity that decides the number of sub-carriers and which sub-carriers to be used is denoted as Carrier Selector (CS) 201.

According to one embodiment of the present invention, the Carrier Selector 201 resides within a MAC layer 203. Super MAC 205, which mainly implements the carrier selector function, is located above MAC Xi (e.g., MAC X1, MAC X2 and MAC X3). Each 1X sub-carrier is served by an individual PHY function. Each PHY Xi (e.g., PHY X1, PHY X2 and PHY X3) corresponds to one MAC Xi, which contains a multiplexing and Quality of Service (QoS) delivery function, for that particular 1X sub-carrier.

For each data unit passed to the MAC layer 203 (denoted as a MAC Service Data Unit (SDU)), the Super MAC 205 via the Carrier Selector 201 selects 1, 2 or 3 sub-carriers to carry the traffic for an enabled multi-carrier mobile user. The MAC SDU is then passed to the corresponding MAC Xi and then to the associated PHY Xi. Under this approach, independent scheduling of data transmission is permitted for each individual 1X sub-carrier.

In an exemplary embodiment, the criteria for carrier selection performed by the Carrier Selector 201 includes a QoS parameter corresponding to specified requirement, channel quality, and/or load of the sub-carriers. The QoS requirement (e.g., bandwidth, delay, loss rate) is used by the CS 201 to determine the number of sub-carriers and which sub-carriers to use to provide the required services. For example, a voice service can be served by one sub-carrier, while a video streaming service may require 2 or 3 sub-carriers. Additionally, the CS 201 can employ a channel quality indicator to assist with determining the appropriate sub-carriers by taking into account channel conditions (characteristics). If the channel quality is poor, then more sub-carriers can be used to ensure proper delivery of the data. Further, the CS 201 can factor in the load of a particular sub-carrier before selecting the sub-carrier for use. If the load on the particular sub-carrier is too high, the CS 201 can choose different sub-carriers with more resources to transmit the data.

Figure 3:
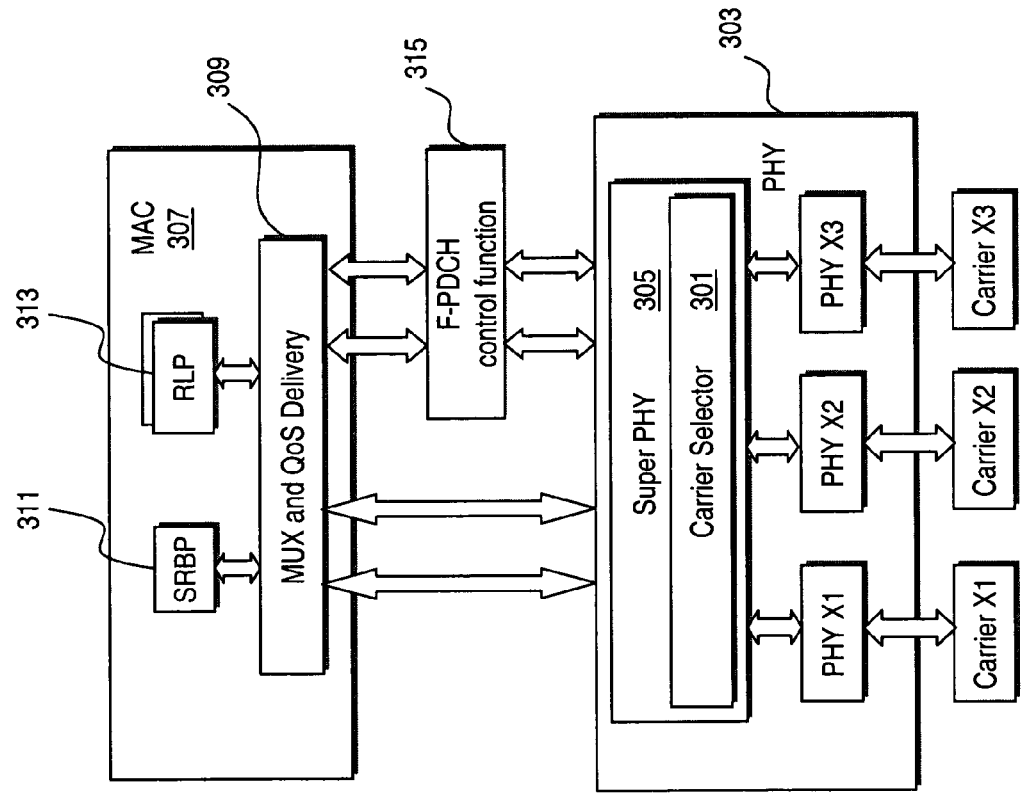
FIG. 3 is a diagram of a radio layer structure with a carrier selector implemented in a Physical (PHY) layer, in accordance with an embodiment of the present invention.

As noted, the example of FIG. 3 is described with respect to a cdma2000 architecture. However, it is contemplated that the carrier selection capability can be applied to any type of multi-carrier system.

In an alternative embodiment, the CS 201 can be implemented in the physical (PHY) layer, as explained below.

FIG. 3 is a diagram of a radio layer structure with a carrier selector implemented in a Physical (PHY) layer, in accordance with an embodiment of the present invention. By way of illustration, this embodiment is described as a 3X system (N=3). As shown, a Carrier Selector 301 resides in a PHY layer 303. Specifically, a Super PHY layer 305 executes the carrier selection function. Each carrier Xi (X1, X2, and X3) is served by one PHY Xi function, which provides all the physical layer functions defined in a 1X system. The Super PHY 305 is above PHY Xi. The PHY layer 303 interfaces with a MAC layer 307 through the Super PHY layer 305. The MAC layer 307 includes a multiplexing (MUX) and a QoS delivery function 309. Also included in the MAC layer 307 is a Signaling Radio Burst Protocol (SRBP) 311, which provides a connectionless protocol for signaling messages. A Radio Link Protocol (RLP) 313 provides a connection-oriented delivery protocol. These entities 311 and 313 are further detailed in 3GPP2 C.S0003-A-1, entitled "Medium Access Control (MAC) Standard for cdma2000 Spread Spectrum Systems Release A—Addendum 1," which incorporated herein by reference in its entirety.

Under this radio layer structure, a forward packet data channel (F-PDCH) control function 315 is supplied between the MUX and QoS delivery function 309 and the Super PHY 305.

For each MAC SDU passed to MAC layer 307, the MAC layer 307 performs the MAC functions, generates the physical layer SDU and passes it to the Super PHY function 305. The CS 301 in the Super PHY 305 selects 1, 2 or 3 sub-carriers to transmit the traffic according to such exemplary criteria as previously described. The PHY SDU is then passed to the corresponding the PHY Xi for transmission. By implementing the CS 301 in the PHY layer 303, both independent scheduling of data transmission for each individual 1X sub-carrier and joint scheduling of data over multiple 1X sub-carriers are allowed.

Figure 4A:
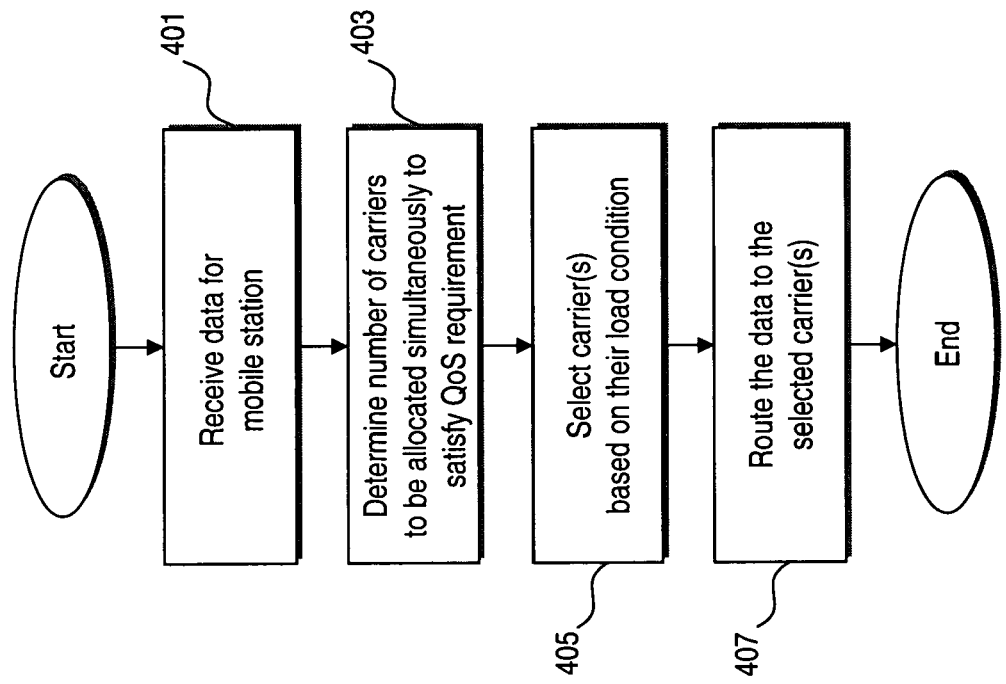
FIGS. 4A and 4B are flowcharts of processes for carrier assignment, according to various embodiments of the present invention.
Figure 4B:
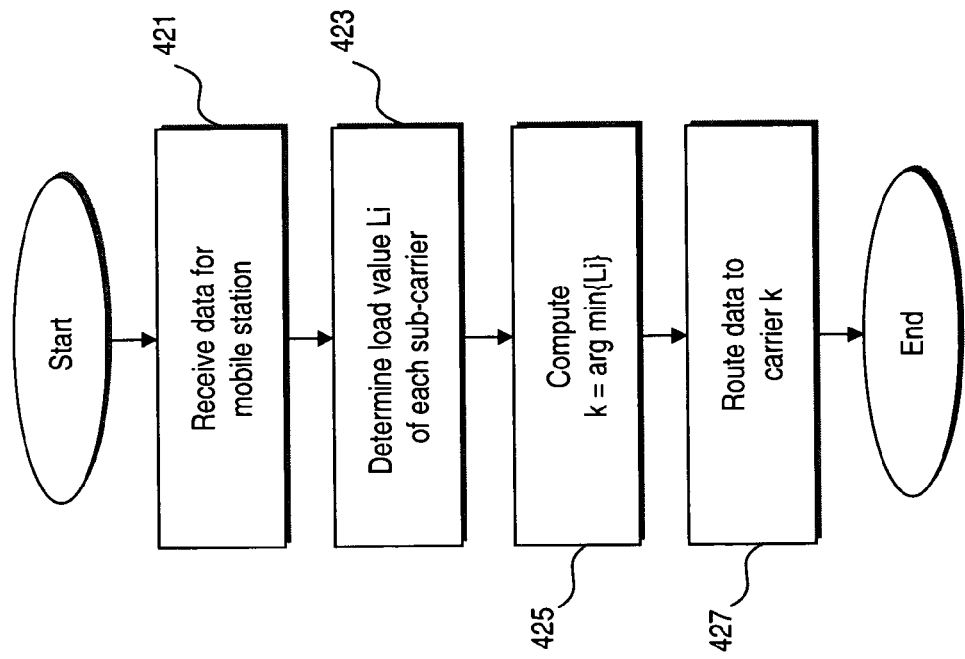

FIGS. 4A and 4B are flowcharts of processes for carrier assignment, according to various embodiments of the present invention. Regardless of where the carrier selector is implemented, the carrier selector (e.g., CS 201) can apply a common approach to selecting the carriers. For the purposes of explanation, when a mobile station, such as MS 101, makes a request for resources, the carrier selector 201 may operate one of the following two modes, as shown respectively in FIG. 4A and FIG. 4B.

Per FIG. 4A, data is received for the mobile station 101, as in step 401. Next, the CS 201 determines the number of carriers to be allocated simultaneously to satisfy the QoS requirement of the mobile station 101, per step 403. The one or more carriers are then selected based on their load condition (step 405). In step 407, the data is routed to the selected carriers for transmission to the mobile station 101.

Alternatively, the CS 201 can select the sub-carriers without regard to any QoS requirement—e.g., factoring only the load of the sub-carriers. In this scenario (as shown in FIG. 4B), upon receiving data from the mobile station 101, the CS 201 determines the load value, Li, for each of the sub-carriers (per steps 421 and 423). In the case of a 3X system, these values would include L1, L2, and L3 for carrier X1, carrier X2, and carrier X3, respectively. Next, the CS 201 computes the least loaded sub-carrier k (per step 425), and routes the data to this sub-carrier k (step 427). Under the above approach, the CS 201 allocates one sub-carrier at a time, and subsequently selects a different carrier based on load condition. Although the carrier selection is explained with respect to loading, any criterion can be used to select the sub-carrier, e.g., channel quality.

The carrier selection capability of the system 100 advantageously improves spectrum efficiency and system throughput. Namely, user data can be scheduled over the exact number of sub-carriers that are needed to provide the required services, instead of being divided evenly over all three sub-carriers as with the conventional approach. Another advantage involves improved power saving efficiency: the mobile station may not need to listen to all the three sub-carriers all the time. Further, the system 100, as a multi-carrier system, supports backward compatibility to 1X technology. That is, the system 100 can serve a 1X user by assigning only one sub-carrier to the subject mobile terminal.

As a further feature of the carrier selection capability, the system 100 can dynamically select the type of carrier, as each of the carriers can be designated as a dedicated carrier, a shared carrier, or a combined carrier. This feature is more fully described below in FIG. 5.

Figure 5:
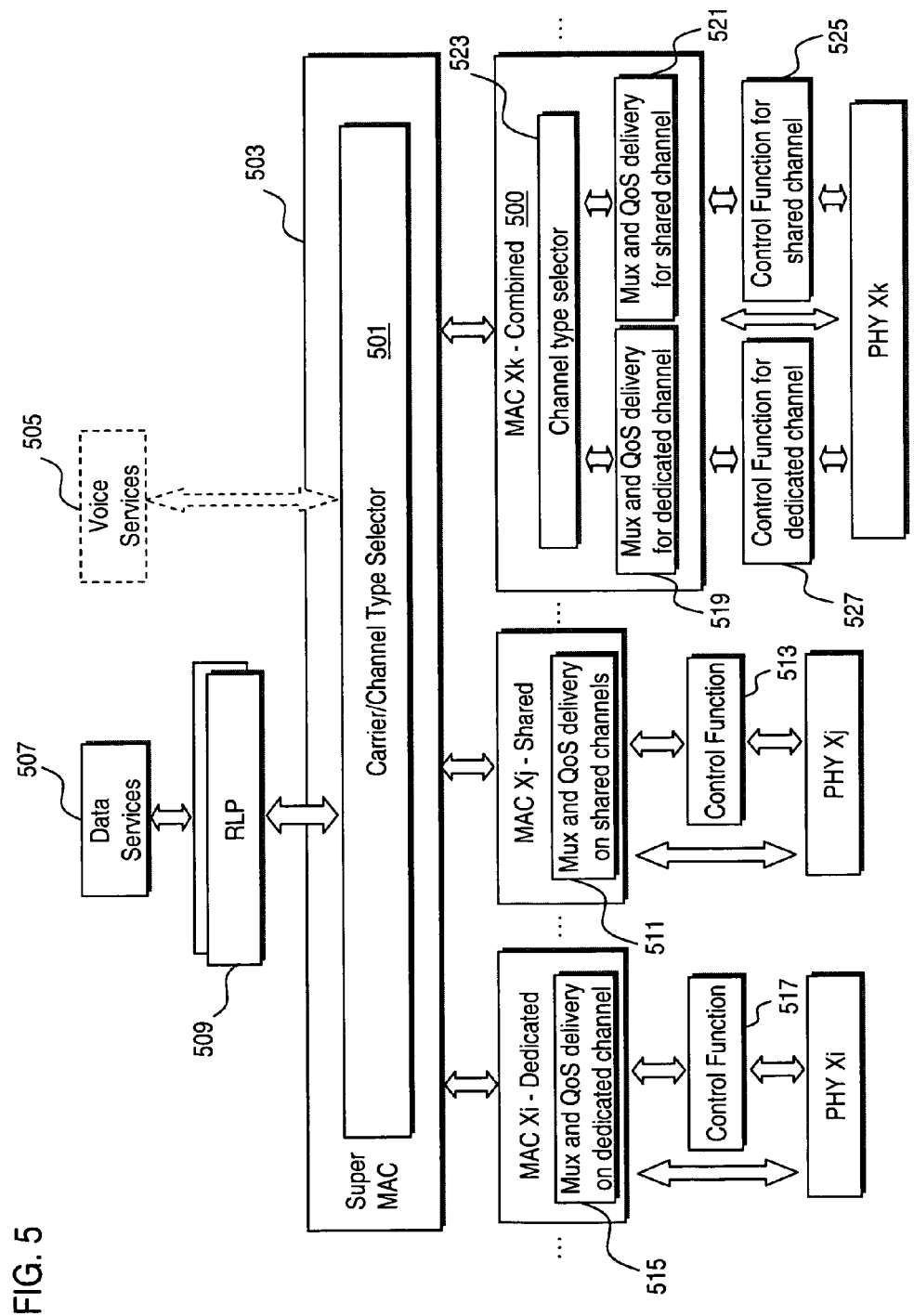
FIG. 5 is a diagram of a MAC layer design for providing channel selection, in accordance with an embodiment of the present invention.

FIG. 5 is a diagram of a MAC layer design for providing channel selection, in accordance with an embodiment of the present invention. The system 100, as explained, can be thought of as operating in two modes: 1X mode and multi-carrier (nX) mode (as the direct evolution for 1X EV-DO). In this example, a carrier/channel type selector 501 is implemented as a function of a Super MAC 503. The carrier/channel type selector 501 can support, for example, voice services 505 and data services 507. Such services 505, 507 are illustrative in nature; it is contemplated that any type of communication services in general can be supported. A Radio Link Protocol (RLP) 509 is provided between the data services 507 and the Super MAC 503. In accordance with an embodiment of the present invention, the Super MAC function 503 selects the carrier as well as the channel type based on, for example, MS mode, traffic type, radio condition etc., and then passes the MAC SDU to the corresponding MAC (Xi, Xj, or Xk). In addition, if the carrier selected is the combined carrier, the Super MAC 503 may also instruct MAC on the channel type to be used.

Irrespective of the operational mode, there are essentially two types of traffic channels to be used in the system 100: a dedicated channel and a shared channel. Dedicated channels are mainly designed to carry real-time application, but can also serve other type of applications under bad channel condition, for example. Shared channel are designed typically for non-real-time application. This channel can also serve real-time applications under good channel quality. According to one embodiment of the present invention, a new carrier is defined: a combined carrier.

When operating in the nX mode, the dedicated channel and the shared channel can be implemented at different carriers at a particular time slot. In other words, one specific carrier would be either a dedicated carrier (which only contains dedicated channels) or a shared carrier (which only contains shared channels) at a certain time slot.

When operating at the 1X mode, the dedicated channels and the shared channels reside in the same carrier, as in a conventional 1X system.

To support both 1X mode and nX mode simultaneously, the radio layer structure of FIG. 5 provides for three types of carriers: a dedicated carrier Xi (which only carries the dedicated traffic channels), a shared carrier Xj (which only carries the shared traffic channels) and a combined carrier Xk (which contains both dedicated and shared channels).

For a 1X mode MS, which will require both dedicated and shared channel, the combined carrier (e.g., Xk) can be assigned. If the 1X mode MS requires dedicated channels, either dedicated carrier (e.g., Xi) or combined carrier (e.g., Xk) can be assigned. Similarly, if 1X mode MS requires a shared channel, either shared carrier (e.g., Xj) or combined carrier (e.g., Xk) can be assigned.

For an nX mode MS that requires dedicated channels, the dedicated carrier (e.g., Xi) and/or the combined carrier (e.g., Xk) can be assigned. In the case of a requirement for shared channels, the shared carrier (e.g., Xj) and/or the combined carrier (e.g., Xk) can be assigned. For an nX mode MS that requires both dedicated and shared channels, the dedicated carrier (e.g., Xi) and the shared carrier (e.g., Xj) and/or the combined carrier (e.g., Xk) can be assigned.

For each type of carrier, the MAC function varies slightly from each other. As shown, for the shared carrier (associated with MAC Xj), the multiplexing and QoS delivery function 511 designed for the shared channels resides on top of the PHY layer Xj. A control function 513 is also provided above the PHY layer Xj. For the dedicated carrier (associated with MAC Xi), the multiplexing and QoS delivery function 515 designed for dedicated channels and a control function 517 also reside on top of the PHY layer Xi.

As regard the combined carrier (associated with MAC Xk), the multiplexing and QoS delivery functions 519 and 521 designed for dedicated or shared channels reside on top of the PHY layer Xk. In addition, on top of the multiplexing and QoS delivery functions 519 and 521 resides a channel type selection function 523. The channel type selection function 523 determines the type of channel to use for a particular MAC SDU passed from the Super MAC 503. Alternatively, the channel type selection function 523 obtains the decision of the type of the channel to be used for a MAC SDU based on the instruction from the Super MAC 503. The carrier selection function 501 then passes the MAC SDU to the corresponding multiplexing and QoS delivery function. Separate control functions 525 and 527 are provided for the dedicated channel and shared channel, respectively.

The radio layer structure of FIG. 5 thus advantageously enables the system 100 to support both 1X mode and nX mode. Under this approach, the system 100 provides backward compatibility to a 1X system (e.g., 1X EV-DO) system, and thus supports an evolution path from 1X to MC-CDMA.

Figure 6A:
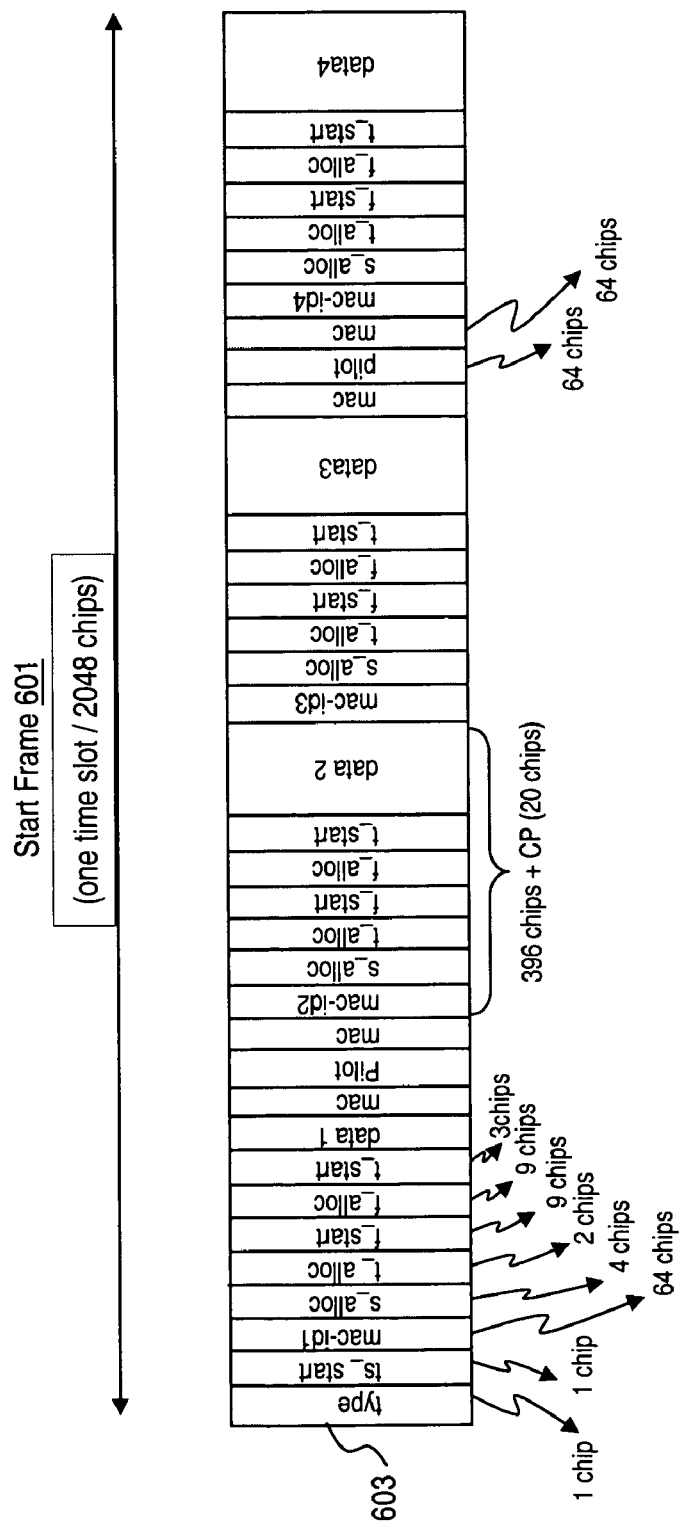
FIG. 6A-6C are diagrams of exemplary structures of dedicated channels with in-band signaling, and a flowchart of a process for determining the carrier type using the exemplary structure, in accordance with an embodiment of the present invention.
Figure 6B:
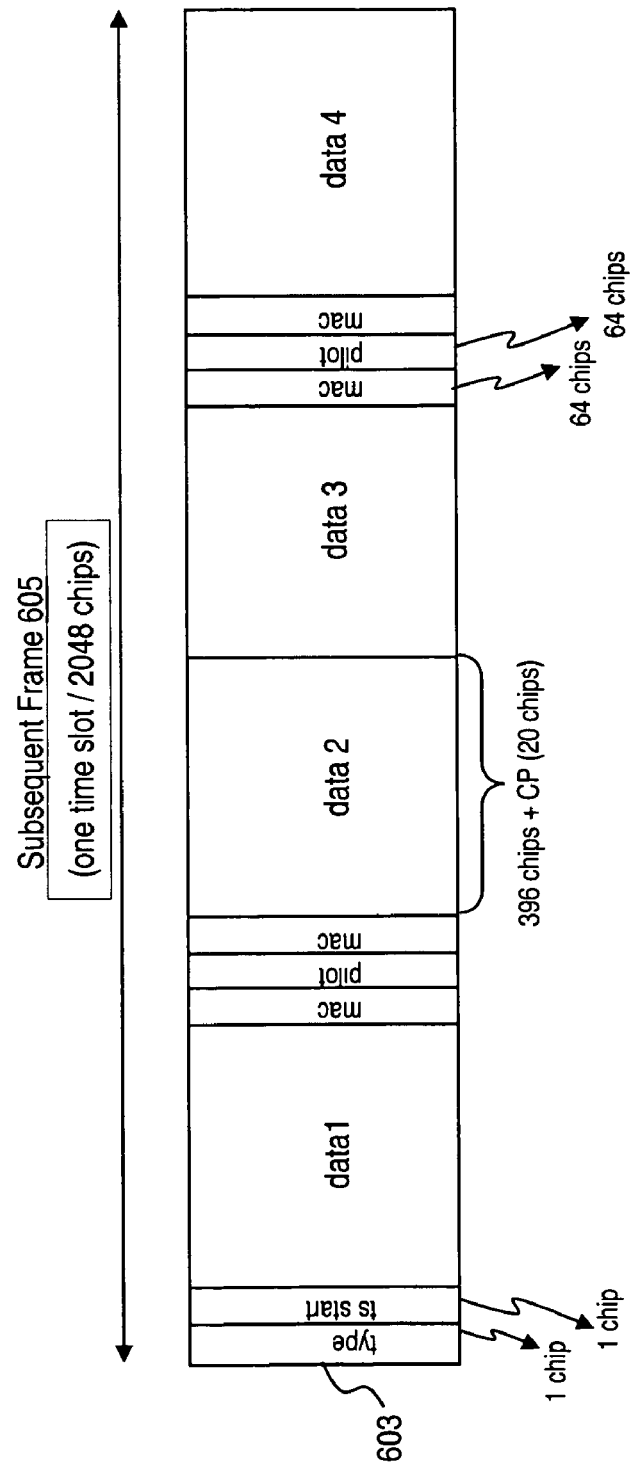
Figure 6C:
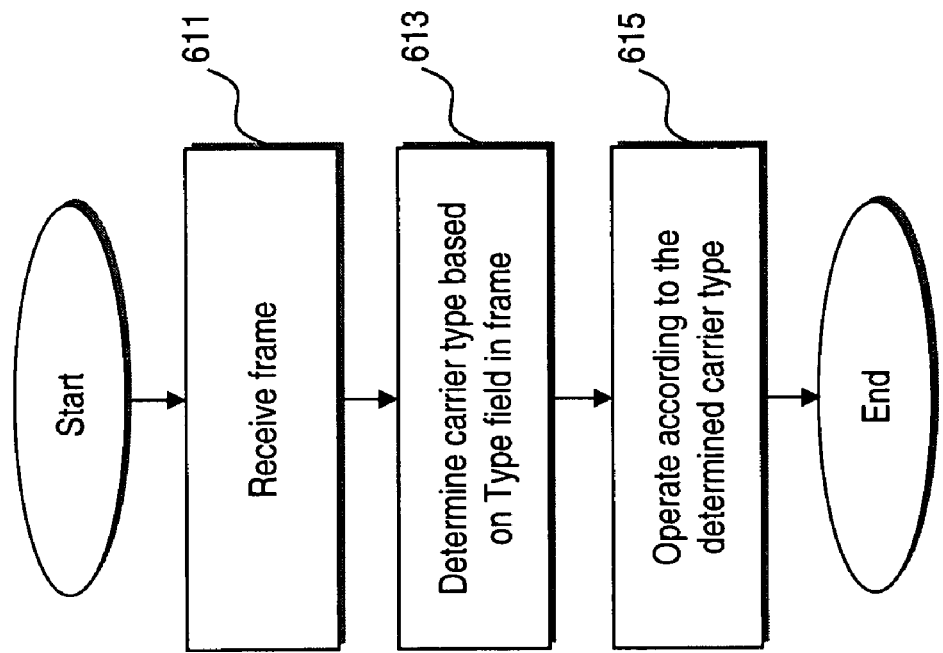

FIG. 6A-6C are diagrams of exemplary structures of dedicated channels with in-band signaling, and a flowchart of a process for determining the channel/carrier type using the exemplary structure, in accordance with an embodiment of the present invention. By way of example, the system 100 is a Multi-Carrier Code Division Multiple Access (MC-CDMA) system. The BS 105 determines the type of a carrier (dedicated, or shared or combined) for a particular time slot. To inform the mobile stations 101, 103 of the carrier type, two signaling mechanisms can be used based on out-of-band signaling and in-band signaling.

For out-of-band signaling, the RAN 115 signals the type of the carrier as well as the related parameter channel configuration parameters. For the combined carrier type, the BS 105 also needs to inform MS 101 of the extra carrier configuration information, as enumerated in Table 1:

TABLE 1

| CONFIG. INFO. | DESCRIPTION |
| --- | --- |
| Assignment of the time slot | The assignment of the time slot during which the carrier remains on the same type, if each time slot only contains one type of channel (either dedicated or shared) |
| Allocated Orthogonal Frequency Division Multiplexing (OFDM) symbols | The OFDM symbols allocated for dedicated or shared channels respectively, if different OFDM symbols inside one slot can support both dedicated and shared channels |
| Allocated Tones | The tones allocated for dedicated or shared channel respectively, if different tones can support different type of channel types |

The out-of-band signaling could be carried over common control channel or broadcast channel, etc. The MSs (e.g., MS 101 and MS 103) listen to these signaling and operate accordingly. For example, the MS 101 (assuming that the station has both dedicated carrier and shared carrier enabled, but is only assigned with dedicated channel) does not need to listen to the enabled shared carriers.

In an alternative embodiment, in-band signaling is used to notify the mobile station of the carrier type. As shown in FIG. 6A, for both dedicated and shared carrier, one chip (e.g., the first one) in the frame (e.g., Start frame 601) for one time slot or for one Orthogonal Frequency Division Multiplexing (OFDM) symbol is always reserved to indicate the type of the carrier—i.e., Type field 603. Other parameters such as assigned OFDM symbol or assigned tones can also be included in the first transmitted frame. No explicit signaling is sent from BTS 107 to the MSs 101, 103. This arrangement allows a more flexible time slot or OFDM symbol or tone assignment and reassignment without waiting for the next signaling period. Other fields in the Start frame 601, in an exemplary embodiment, are listed in Table 2. Subsequent frames 605 also specifies a Type field 603 (FIG. 6B).

TABLE 2

| FIELD | DESCRIPTION |
| --- | --- |
| Type | Carrier type |
| ts_start | Specifies whether first or subsequent frame |
| mac-id | MAC identifier of the mobile station |
| s_alloc | symbol allocation |
| t_alloc | tone allocation |
| f_start | frame start |
| f_alloc | frame allocation |
| t_start | tone start |
| Data | data payload of mobile station |
| Pilot | pilot symbols |
| Mac | MAC address |

Turning to FIG. 6C, a mobile station, such MS 101 in the system 100, can readily determine the channel type using the dedicated channel structures of FIGS. 6A and 6B. In step 611, the MS 101 receives a frame. The MS 101 always reads the first chip (Type field 603) to determine the carrier type, as in step 613. Next, determines the carrier type and operates accordingly, as in step 615.

The processes described above a carrier/channel selection scheme to support backward compatibility and improved network efficiency. The processes detailed above can be executed through a variety of hardware and/or software configurations.

Figure 7:
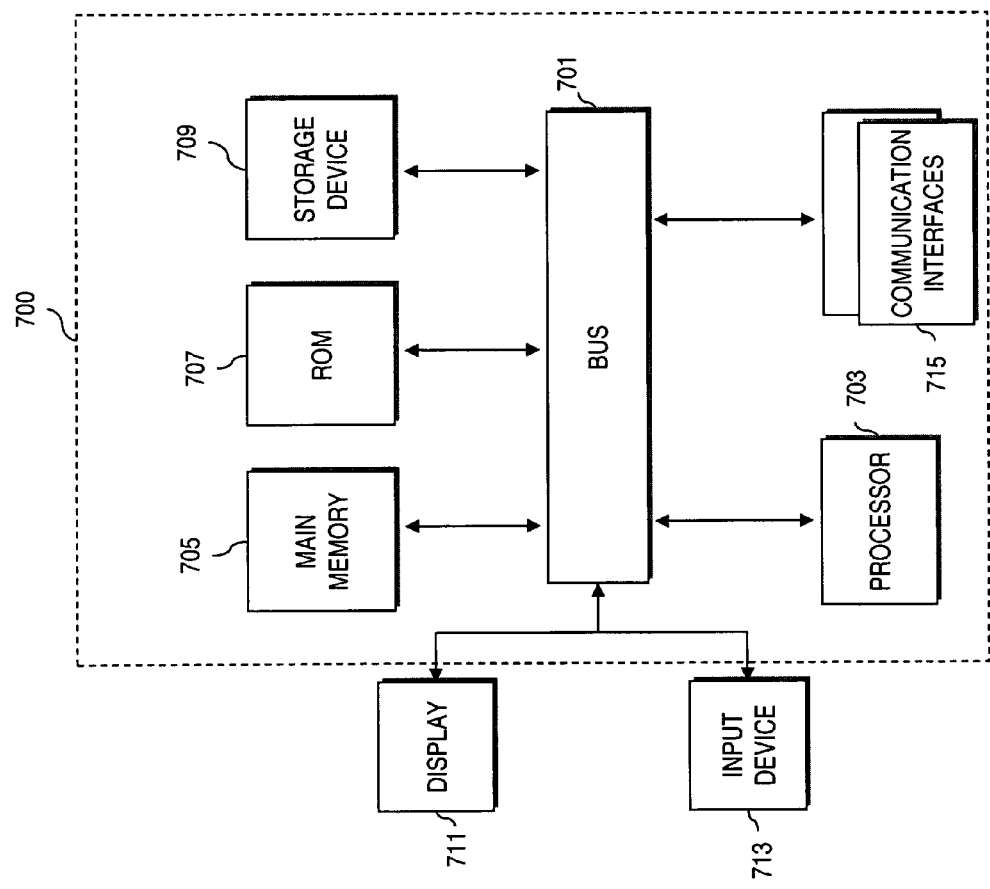
FIG. 7 is a diagram of hardware that can be used to implement an embodiment of the present invention.

FIG. 7 illustrates exemplary hardware upon which an embodiment according to the present invention can be implemented. A computing system 700 includes a bus 701 or other communication mechanism for communicating information and a processor 703 coupled to the bus 701 for processing information. The computing system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computing system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computing system 700 may be coupled via the bus 701 to a display 711, such as a liquid crystal display, or active matrix display, for displaying information to a user. An input device 713, such as a keyboard including alphanumeric and other keys, may be coupled to the bus 701 for communicating information and command selections to the processor 703. The input device 713 can include a cursor control, such as a mouse, a trackball, or cursor direction keys, for communicating direction information and command selections to the processor 703 and for controlling cursor movement on the display 711.

According to one embodiment of the invention, the processes of FIGS. 4A and 4B can be provided by the computing system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computing system 700 also includes at least one communication interface 715 coupled to bus 701. The communication interface 715 provides a two-way data communication coupling to a network link (not shown). The communication interface 715 sends and receives electrical, electromagnetic, or optical signals that carry digital data streams representing various types of information. Further, the communication interface 715 can include peripheral interface devices, such as a Universal Serial Bus (USB) interface, a PCMCIA (Personal Computer Memory Card International Association) interface, etc.

The processor 703 may execute the transmitted code while being received and/or store the code in the storage device 709, or other non-volatile storage for later execution. In this manner, the computing system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for communicating in a multi-carrier system, the method comprising:
   determining whether a station operates according to a single carrier mode or a multiple carrier mode at a device;
   selecting one or more carriers from a plurality of carriers for transport of data over the multi-carrier system at the device, wherein the plurality of carriers include a dedicated carrier, a shared carrier, and a combined carrier, wherein the combined carrier supports capacity that is partially shared and partially dedicated, and wherein the combined carrier is selected for the station if the station is determined to operate in the single carrier mode, wherein the dedicated carrier and the shared carrier are implemented at a same time slot;
   operating a carrier in single carrier mode or multi-carrier mode based on the determination of an operating mode, wherein operating in single carrier mode enables communication with a conventional 1X system;
   from the device, sending the station the determined mode of operation using a same band and a same channel that is to be used to transport the data; and
   from the device, initiating transmission of the data using the one or more selected carriers.

2. The method according to claim 1, wherein the selection is based on one or more criterion selected from a quality of service parameter associated with the transmission, a quality of a channel supporting the plurality of carriers, and a load corresponding to each of the plurality of carriers.

3. The method according to claim 1, further comprising: dynamically switching to a new carrier.

4. The method according to claim 1, wherein the selection is performed at a physical layer.

5. The method according to claim 1, wherein the carriers are sub-carriers, and the multi-carrier system is a Code Division Multiple Access (CDMA)-based system.

6. The method of claim 2, wherein the quality of service parameter comprises one or more criterion selected from a bandwidth requirement, a delay requirement or a loss rate requirement.

7. The method according to claim 1, wherein the selection is based on one or more criterion selected from a mode of operation of a station, a traffic type associated with the data, and a radio condition corresponding to each of the plurality of carriers.

8. The method according to claim 1, wherein the one or more carriers from the plurality of carriers are scheduled independently.

9. The method according to claim 1, wherein transmission of the data using the one or more selected carriers is not spread evenly between the one or more selected carriers.

10. The method according to claim 1, wherein selecting one or more carriers from a plurality of carriers for transport of data occurs at a media access control layer.

11. The method of claim 1, wherein each carrier of the plurality of carriers is served by an individual physical layer function.

12. The method of claim 1, further comprising selecting a number of carriers from a plurality of carriers for transport of data over the multi-carrier system at the device based on an exact number of carriers that are needed to provide a required service.

13. A memory bearing instructions for communicating in a multi-carrier system, said instructions, if executed, being arranged to cause one or more processors of the device to perform one or more operations of claim 1.

14. An apparatus for communicating in a multi-carrier system, the apparatus comprising:
means for determining whether a station operates according to a single carrier mode or a multiple carrier mode;
means for selecting one or more carriers from a plurality of carriers for transport of data over the multi-carrier system, wherein the plurality of carriers include a dedicated carrier, a shared carrier, and a combined carrier, wherein the combined carrier supports capacity that is partially shared and partially dedicated, and wherein the combined carrier is selected for the station if the station operates in the single carrier mode, wherein the dedicated carrier and the shared carrier are implemented at a same time slot;
means for operating a carrier in single carrier mode or multi-carrier mode based on the determination of an operating mode, wherein operating in single carrier mode enables communication with a conventional 1X system;
means for sending the station the determined mode of operation using a same band and a same channel to be used to transport the data; and
means for initiating transmission of the data using the one or more selected carriers.

15. The apparatus according to claim 14, wherein the selection is based on one or more criterion selected from a quality of service parameter associated with the transmission, a quality of a channel supporting the plurality of carriers, and a load corresponding to each of the plurality of carriers.

16. The method of claim 15, wherein the quality of service parameter comprises one or more criterion selected from a bandwidth requirement, a delay requirement or a loss rate requirement.

17. The apparatus according to claim 14, further comprising means for dynamically switching to a new carrier.

18. The apparatus according to claim 14, wherein the selection is performed at a physical layer.

19. The apparatus according to claim 14, wherein the carriers are sub-carriers, and the multi-carrier system is a Code Division Multiple Access (CDMA)-based system.

20. The apparatus according to claim 14, wherein the selection is based on one or more criterion selected from a mode of operation of a station, a traffic type associated with the data, and a radio condition corresponding to each of the plurality of carriers.

21. The apparatus according to claim 14, wherein the one or more carriers from the plurality of carriers are scheduled independently.

22. The method according to claim 14, wherein transmission of the data using the one or more selected carriers is not spread evenly between the selected carriers.

23. The method according to claim 14, wherein selecting one or more carriers from a plurality of carriers for transport of data occurs at a media access control layer.

24. The method of claim 14, wherein each carrier of the plurality of carriers is served by an individual physical layer function.

25. The method of claim 14, further comprising a means for selecting a number of carriers from a plurality of carriers for transport of data over the multi-carrier system at the device based on an exact number of carriers that are needed to provide a required service.

26. An apparatus for communicating in a multi-carrier system, the apparatus comprising:
a carrier selector configured to determine a mode of operation of a station, the mode of operation specifying use of a single carrier or multiple carriers, to select one or more carriers from a plurality of carriers for transport of data over the multi-carrier system, and to send the station the determined mode of operation using a same band and a same channel that is to be used to transport the data, wherein the data is transmitted using the selected one or more carriers, wherein the dedicated carrier and the shared carrier are implemented at a same time slot;
wherein the plurality of carriers include a dedicated carrier, a shared carrier, and a combined carrier, wherein the combined carrier supports capacity that is partially shared and partially dedicated, and wherein the combined carrier is selected if the station uses the single carrier mode of operation; and
wherein a carrier is operated in single carrier mode or multi-carrier mode based on the determination of an operating mode, wherein operating in single carrier mode enables communication with a conventional 1X system.

27. The apparatus according to claim 26, wherein the carrier selector selects according to one or more criterion selected from a quality of service parameter associated with the transmission, a quality of a channel supporting the plurality of carriers, and a load corresponding to each of the plurality of carriers.

28. The method of claim 27, wherein the quality of service parameter comprises one or more criterion selected from a bandwidth requirement, a delay requirement or a loss rate requirement.

29. The apparatus according to claim 26, wherein the carrier selector dynamically switches to a new carrier.

30. The apparatus according to claim 26, wherein the selection is performed at a physical layer.

31. The apparatus according to claim 26, wherein the carriers are sub-carriers, and the multi-carrier system is a Code Division Multiple Access (CDMA)-based system.

32. The apparatus according to claim 26, wherein the selection is based on one or more criterion selected from the mode of operation, a traffic type associated with the data, and a radio condition corresponding to each of the plurality of carriers.

33. A method for supporting communication in a multi-carrier spread spectrum system, the method comprising:
determining a mode of operation of a station, the mode of operation specifying use of a single carrier or multiple carriers;
selecting one or more sub-carriers from a plurality of sub-carriers for use in the multi-carrier spread spectrum system according to one or more criterion selected from a Quality of Service requirement, a channel quality, and a load of each of the plurality of sub-carriers; and
sending the station the determined mode of operation using a same band and a same channel to be used to transport data;
wherein the plurality of sub-carriers include a dedicated carrier, a shared carrier, and a combined carrier, wherein the combined carrier supports capacity that is partially shared and partially dedicated, wherein the dedicated carrier and the shared carrier are implemented at a same time slot, and wherein the combined carrier is selected if the single carrier mode of operation is used by the station.

34. The method according to claim 33, wherein the selection is performed at a physical layer.

35. The method of claim 33, wherein the quality of service requirement comprises one or more criterion selected from a bandwidth requirement, a delay requirement or a loss rate requirement.

36. A method for supporting communication in a multi-carrier spread spectrum system, the method comprising:
determining a mode of operation of a mobile station, wherein the mode includes a 1X mode corresponding to use of a single carrier and a nX mode corresponding to use of multiple carriers;
selecting one or more carriers from a plurality of carriers according to the determined mode of operation, wherein the plurality of carriers include a dedicated carrier, a shared carrier, and a combined carrier, wherein the combined carrier supports capacity that is partially shared and partially dedicated, wherein the dedicated carrier and the shared carrier are implemented at a same time slot, and wherein the combined carrier is selected if the determined mode of operation is the 1X mode, and
sending the mobile station the determined mode of operation using a same band and a same channel to be used to transport data.

37. The method according to claim 36, wherein the selection of the one or more carriers is further based on one or more criterion selected from a traffic type associated with the data, a load condition corresponding to each of the plurality of carriers, and a radio condition corresponding to each of the plurality of carriers.

38. The method according to claim 36, wherein the selection is performed at a physical layer.

39. A method for communicating in a multi-carrier system, the method comprising:
determining whether a station operates according to a single carrier mode or a multiple carrier mode;
selecting, at a physical layer of a first device, one or more carriers from a plurality of carriers for transport of data over a multi-carrier system, wherein the plurality of carriers include a dedicated carrier, a shared carrier, and a combined carrier, wherein the combined carrier supports capacity that is partially shared and partially dedicated, wherein the dedicated carrier and the shared carrier are implemented at a same time slot, and wherein the combined carrier is selected for the station if the station is determined to operate in the single carrier mode; and
notifying the station of the determined mode of operation.

40. The method according to claim 39, wherein the selection is based on one or more criterion selected from the mode of operation, a traffic type associated with the data, a load condition corresponding to each of the plurality of carriers, and a radio condition corresponding to each of the plurality of carriers.

41. An apparatus for communicating in a multi-carrier system, the apparatus comprising:
a carrier selector configured in a physical layer to determine a mode of operation of a station, the mode of operation specifying use of a single carrier or multiple carriers, to select one or more carriers from a plurality of carriers for transport of data over a multi-carrier system, and to notify the station of the determined mode of operation,
wherein the data is transmitted using the selected one or more carriers,
and further wherein the plurality of carriers include a dedicated carrier, a shared carrier, and a combined carrier, wherein the combined carrier supports capacity that is partially shared and partially dedicated, wherein the dedicated carrier and the shared carrier are implemented at a same time slot, and wherein the combined carrier is selected if the station uses the single carrier mode of operation.

42. The apparatus according to claim 41, wherein the selection is based on one or more criterion selected from the mode of operation, a traffic type associated with the data, a load condition corresponding to each of the plurality of carriers, and a radio condition corresponding to each of the plurality of carriers.

\* \* \* \* \*

UNITED STATES PATENT AND TRADEMARK OFFICE
CERTIFICATE OF CORRECTION

| | | |
|---|---|---|
| PATENT NO. | : 8,130,781 B2 | |
| APPLICATION NO. | : 11/068064 | |
| DATED | : March 6, 2012 | |
| INVENTOR(S) | : Zheng et al. | |

It is certified that error appears in the above-identified patent and that said Letters Patent is hereby corrected as shown below:

Column 11, line 14, in Claim 6, delete "The method of claim 2," and insert -- The method according to claim 2, --.

Column 11, line 32, in Claim 11, delete "The method of claim 1," and insert -- The method according to claim 1, --.

Column 11, line 35, in Claim 12, delete "The method of claim 1," and insert -- The method according to claim 1, --.

Column 12, line 6, in Claim 16, delete "The method of claim 15," and insert -- The apparatus according to claim 15, --.

Column 12, line 25, in Claim 22, delete "The method according to claim 14," and insert -- The apparatus according to claim 14, --.

Column 12, line 28, in Claim 23, delete "The method according to claim 14," and insert -- The apparatus according to claim 14, --.

Column 12, line 31, in Claim 24, delete "The method of claim 14," and insert -- The apparatus according to claim 14, --.

Column 12, line 34, in Claim 25, delete "The method of claim 14," and insert -- The apparatus according to claim 14, --.

Column 13, line 1, in Claim 28, delete "The method of claim 27," and insert -- The apparatus according to claim 27, --.

Column 13, line 25, in Claim 33, delete "Quality of Service" and insert -- quality of service --.

Signed and Sealed this
Fourth Day of December, 2012

David J. Kappos
*Director of the United States Patent and Trademark Office*

Column 13, line 40, in Claim 35, delete "The method of claim 33," and insert -- The method according to claim 33, --.

Column 13, line 58, in Claim 36, delete "mode, and" and insert -- mode; and --.